United States Patent
Hubbell et al.

(10) Patent No.: US 11,644,330 B2
(45) Date of Patent: May 9, 2023

(54) SETTING DESTINATIONS IN VEHICLE NAVIGATION SYSTEMS BASED ON IMAGE METADATA FROM PORTABLE ELECTRONIC DEVICES AND FROM CAPTURED IMAGES USING ZERO CLICK NAVIGATION

(71) Applicant: Rivian IP Holdings, LLC, Plymouth, MI (US)

(72) Inventors: Christian Hubbell, Waterford, MI (US); Philipp Beisel, San Jose, CA (US); Suraj-Hebbar Shankar, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 274 days.

(21) Appl. No.: 16/923,700

(22) Filed: Jul. 8, 2020

(65) Prior Publication Data
US 2022/0011129 A1 Jan. 13, 2022

(51) Int. Cl.
*G06F 3/048* (2013.01)
*G01C 21/36* (2006.01)
(Continued)

(52) U.S. Cl.
CPC ....... *G01C 21/362* (2013.01); *G01C 21/3667* (2013.01); *G06F 16/29* (2019.01); *G06F 16/487* (2019.01); *H04W 4/48* (2018.02)

(58) Field of Classification Search
CPC ... G01C 21/362; G01C 21/3667; H04W 4/48; G06F 16/487; G06F 16/29
See application file for complete search history.

(56) References Cited

U.S. PATENT DOCUMENTS 7,928,905 B2 * 4/2011 Broadbent ......... G01C 21/3602
342/357.71
9,239,603 B2 * 1/2016 LeBeau ................. G06F 1/3265
(Continued)

OTHER PUBLICATIONS

Tobias Weyand, et al., PlaNet—Photo Geolocation with Convolutional Neural Networks; Springer International Publishing AG 2016, B. Leibe et al. (Eds.): ECCV 2016, Part VIII, LNCS 9912, pp. 37-55, 2016.

(Continued)

*Primary Examiner* — David Pharitana-angkool
(74) *Attorney, Agent, or Firm* — Clements Bernard Walker; Christopher L. Bernard (57) ABSTRACT

Disclosed embodiments include methods, systems, and non-transitory computer readable media for setting a destination at a vehicle navigation system and methods, systems, and non-transitory computer readable media for setting a destination in a vehicle navigation system. In an illustrative embodiment, a method of setting a destination at a vehicle navigation system includes: connecting, by the vehicle, to a wireless device of a vehicle occupant; receiving, by the vehicle, a location signal from the wireless device indicating a geographical location corresponding to a selected media file on the wireless device; generating, by the vehicle, a destination location responsive to the location signal; determining a destination location responsive to the location signal; and plotting a navigation course to the determined destination location.

14 Claims, 4 Drawing Sheets

(51) Int. Cl.
  *H04W 4/48* (2018.01)
  *G06F 16/29* (2019.01)
  *G06F 16/487* (2019.01)

(56) References Cited

U.S. PATENT DOCUMENTS

| | | | | |
|---|---|---|---|---|
| 9,671,243 | B2* | 6/2017 | Stein | G01C 21/3644 |
| 10,444,752 | B2* | 10/2019 | Kim | G05D 1/0251 |
| 10,701,661 | B1* | 6/2020 | Coelho | H04W 4/023 |
| 10,878,441 | B2* | 12/2020 | Hollinger | G06Q 30/0271 |
| 10,931,769 | B2* | 2/2021 | McNeill | H04L 67/55 |
| 11,308,098 | B2* | 4/2022 | Poddar | G06F 16/24578 |
| 11,367,139 | B2* | 6/2022 | Cunningham | G06F 40/221 |
| 2011/0216938 | A1* | 9/2011 | Suzuki | G06K 9/00 382/103 |
| 2011/0230169 | A1* | 9/2011 | Ohki | G08G 1/096872 340/425.5 |
| 2012/0083285 | A1* | 4/2012 | Shatsky | G01S 19/48 455/456.1 |
| 2014/0295887 | A1* | 10/2014 | Redfern | G06V 20/56 455/456.3 |
| 2015/0116103 | A1* | 4/2015 | Yang | G08B 21/24 340/438 |
| 2017/0038941 | A1* | 2/2017 | Pylappan | G01C 21/3676 |
| 2019/0360815 | A1* | 11/2019 | Ledet | G06F 16/24578 |
| 2019/0384294 | A1* | 12/2019 | Shashua | G06V 20/584 |
| 2020/0064149 | A1* | 2/2020 | Yuan | G01C 21/3626 |
| 2020/0065842 | A1* | 2/2020 | Viswanathan | G06Q 50/30 |
| 2020/0082716 | A1* | 3/2020 | Britt | G01C 21/3492 |
| 2020/0160707 | A1* | 5/2020 | Yasui | G06Q 50/10 |
| 2020/0302510 | A1* | 9/2020 | Chachek | G06V 20/52 |
| 2020/0322178 | A1* | 10/2020 | Wang | H04W 4/33 |
| 2020/0348906 | A1* | 11/2020 | Barnes, Jr. | G06Q 20/20 |
| 2020/0385014 | A1* | 12/2020 | Hanniel | B60W 60/001 |
| 2021/0123752 | A1* | 4/2021 | Rolf | G01C 21/3453 |
| 2021/0199437 | A1* | 7/2021 | Breed | G01C 21/1656 |
| 2021/0202067 | A1* | 7/2021 | Williams | A61B 5/0022 |
| 2021/0281977 | A1* | 9/2021 | Ebner | G06N 3/04 |
| 2021/0341303 | A1* | 11/2021 | Rappel-Kroyzer | G08G 1/0141 |
| 2021/0364310 | A1* | 11/2021 | Rolf | G01C 21/3617 |
| 2021/0397420 | A1* | 12/2021 | Stachura | G06F 8/30 |
| 2022/0011129 | A1* | 1/2022 | Hubbell | H04W 4/48 |
| 2022/0163343 | A1* | 5/2022 | Nurminen | G01C 21/3682 |
| 2022/0183208 | A1* | 6/2022 | Sibley | A01B 79/005 |
| 2022/0260385 | A1* | 8/2022 | Beste | G01C 21/3617 |
| 2022/0286488 | A1* | 9/2022 | Berliner | H04L 65/403 |

OTHER PUBLICATIONS

Reshmi Krishnan et al., A Survey On Image Matching Methods; International Journal of Latest Research in Engineering and Technology (IJLRET) ISSN: 2454-5031, www.ijlret.com\\ vol. 2 Issue 1\\ Jan. 2016\\ pp. 58-61.

Ales Leonardis et al., Computer Vision-ECCV 2006; 9th European Conference on Computer Vision, Graz, Autria, May 2006 Proceedings, Part 1, LNCS 3951, pp. 430-443, 2006.

David G. Lowe, Object Recognition from Local Scale-Invariant Features; Computer Science Department, University at British Columbia, Vancouver, B.C. V6T 1Z4, Canda, lowe@cs.ubc.ca.

Herbert Bay et al., Speeded-Up Robust Features (SURF); ScienceDirect, Computer Vision and Image Understanding 110 (2008) pp. 346-359, www.elsevier.com/locate/cviu.

Relja Arandjelovic et al., NetVLAD: CNN architecture for weakly supervised place recognition; arXiv:1511.07247v3 [cs.CV] May 2, 2016.

* cited by examiner

SETTING DESTINATIONS IN VEHICLE NAVIGATION SYSTEMS BASED ON IMAGE METADATA FROM PORTABLE ELECTRONIC DEVICES AND FROM CAPTURED IMAGES USING ZERO CLICK NAVIGATION

INTRODUCTION

The present disclosure relates to automotive vehicles, and more particularly to navigation.

The statements in this section merely provide background information related to the present disclosure and may not constitute prior art.

The entry of a destination into a vehicle navigation system can be cumbersome. For example, a vehicle occupant may need to activate an interface with the vehicle navigation system, such as by selecting a button in the vehicle or an icon or text on an interface within the vehicle. The vehicle occupant then may need to select an icon or text to open another interface within which a destination can be entered. Within that interface, the vehicle occupant then may need to enter the city, state, and street address of the destination, or to select the destination from among a list of points of interest, or to select a point on a map that corresponds to the destination.

BRIEF SUMMARY

Various disclosed embodiments include methods of setting a destination at a vehicle navigation system, systems for setting a destination at a vehicle navigation system, non-transitory computer readable media for setting a destination at a vehicle navigation system, methods of setting a destination in a vehicle navigation system, systems for setting a destination at a vehicle navigation system, and non-transitory computer readable media for setting a destination at a vehicle navigation system.

In an illustrative embodiment, a method of setting a destination at a vehicle navigation system includes: connecting, by the vehicle, to a wireless device of a vehicle occupant; receiving, by the vehicle, a location signal from the wireless device indicating a geographical location corresponding to a selected media file on the wireless device; generating, by the vehicle, a destination location responsive to the location signal; determining a destination location responsive to the location signal; and plotting a navigation course to the determined destination location.

In another illustrative embodiment, a system for setting a destination at a vehicle navigation system includes: a processing system; and a memory, wherein the processing system is configured to: connect a wireless transceiver at an automotive vehicle a to a wireless device of a vehicle occupant; receive a location signal from the wireless device indicating a geographical location corresponding to a selected media file on the wireless device; generate a destination location responsive to the location signal; and plot a navigation course to the determined destination location.

In another illustrative embodiment, a non-transitory computer readable medium for setting a destination at a vehicle navigation system includes computer program instructions which, when executed, cause a computer processing system to execute the method of paragraph 0005.

In another illustrative embodiment, a method of setting a destination in a vehicle navigation system includes: capturing an image with a camera of a picture presented by a vehicle occupant where the picture is indicative of a destination location; analyzing the captured image with image analysis and with reference to database information to determine a destination location associated with the captured image; and determining a navigation route to the determined destination location.

In another illustrative embodiment, a system for setting a destination at a vehicle navigation system includes: a processing system; and a memory, wherein the processing system is configured to: cause a camera to capture an image of a picture presented by a vehicle occupant where the picture is indicative of a destination location; analyze the captured image with image analysis and with reference to database information to determine a destination location associated with the captured image; and determine a navigation route to the determined destination location.

In another illustrative embodiment, a non-transitory computer readable medium for setting a destination at a vehicle navigation system includes computer program instructions which, when executed, cause a computer processing system to execute the method of paragraph 0008.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Given by way of non-limiting overview, systems and methods can help contribute to facilitating a vehicle navigation system, for example, by communicating location information to the navigation system based on location data for the destination received from a wireless device in communication with the vehicle navigation system, or by having the vehicle navigation system capture with a camera imagery of the desired location from a picture (which may be or include written information) provided by the passenger and process that image data via image analysis to identify the intended location, or both. In some examples, the location signal can indicate a geographical location that may correspond to a media file on the wireless device, such as a photograph or video that a vehicle occupant selects, i.e., the location signal may convey geolocation metadata obtained when and where the image was taken and stored along with the image. In some examples, a picture of a desired location (e.g., landmark, monument, streetscape, statue, map intersection, written address, etc., in paper form or in electronic form displayed on the screen of a smartphone or other mobile device) may be presented by the passenger to a camera of the vehicle, and the image may be captured by the camera and processed by the vehicle's computer processing system by image analysis to determine the desired destination location. In any case, the navigation system may visually or verbally (through voice rendering or the like) communicate the identified location to the passenger so that the passenger may confirm the intended designation location before navigation begins. Illustrative approaches described herein may address such needs.

As described in examples herein, the present systems and methods may help contribute to providing setting a destination in a vehicle navigation system based on a media file selected on a wireless device, such as a smartphone, of a vehicle occupant. For example, the selected media file, such as a photograph or video, can include metadata information about a geographical location (geolocation data) shown in or otherwise associated with that media file, e.g., an address or a latitude and longitude of the geographical location (GPS coordinates) at which the media file was generated, sometimes referred to as a geotag of a media file. Responsive to user selection of such a media file, the smartphone or other portable electronic device of the passenger can establish communication with and transmit a location signal to the vehicle navigation system that indicates that geographical location. For example, the user may be prompted by the navigation system with multiple options for navigating to a desired destination. For example, voice rendering at the vehicle (e.g., a driverless, autonomous vehicle) may ask whether the passenger would like to verbally state a destination address, communicate metadata from a desired image file to identify the location, present an image of the desired location which the navigation system may then analyze by image analysis to determine the desired location, or combinations thereof, e.g., hone in on the specific destination as may be required near the end of the trip. The passenger may verbally or through touchscreen on a smartphone or mobile device, or on a passenger touchscreen of the vehicle itself, command the vehicle navigation system to access the image metadata of an image currently displayed on the passenger's smartphone via suitable communication (e.g., wireless, Bluetooth, etc.) and permissions granted by the passenger on the passenger's smartphone device. Optionally, the location signal may include the selected media file itself, together with the information about that geographical location. Responsive to receipt of the location signal, the vehicle can generate a navigation system destination corresponding to that geographical location. The vehicle navigation system can state the intended destination via voice rendering to the passenger and receive the passenger's confirmation (e.g., a verbal command, a touchscreen input, etc.) confirming the destination. The vehicle navigation system can then begin navigation and the vehicle can take the passenger to the identified destination location. As such, examples herein can allow information such as addresses and latitude and longitude to be read from media files such as photos and videos such that the address or latitude and longitude can be automatically utilized by a vehicle's navigation system. Sharing a photograph or video is more familiar to most than entering an address into a vehicle's navigation system.

Media files can include embedded data which often include latitudes and longitudes or addresses. As described herein, the present systems and methods can read the metadata from these files and automatically enter the locations into a map-based navigation system. An illustrative use case for such systems and methods would be to share with the vehicle a photograph or video stored on the vehicle occupant's smartphone or within a browser on the vehicle occupant's smartphone, and have the navigation system of that vehicle automatically navigate to a destination shown in or otherwise associated with that photograph or video. Alternatively, simply the location metadata can be shared with the vehicle navigation system, but not the passenger's image itself, if desired, depending on permissions granted by the passenger, e.g., via preferences and/or touchscreen input.

In some configurations, the vehicle optionally can receive the media files from the wireless device and store the media files. This also allows for photos or videos to appear on the map in a navigation interface of the vehicle's navigation system and used as icons or avatars for known (stored) locations. For example, instead of recent addresses being shown in the navigation interface, photographs may be displayed on the map so as to personalize the experience. Additionally, or alternatively, the vehicle optionally can be configured so as to associate destinations with various media files so that visiting that destination causes the vehicle to display, on the navigation interface, one or more media files associated with that destination. In a nonlimiting example, if the destination location is a particle beach or other recreational destination, while the vehicle is driven to that beach destination, the vehicle may display photographs and/or videos taken at that beach or recreational destination from the particular passenger's collection of media/images (those media having been tagged with similar location metadata for east of identification) or from any database available via the Internet, e.g., images and videos from travel websites and the like. In another nonlimiting example, each time the vehicle is driven to a passenger's home, the vehicle may display a favorite family photograph, such as a photograph of the family's children.

Figure 1:
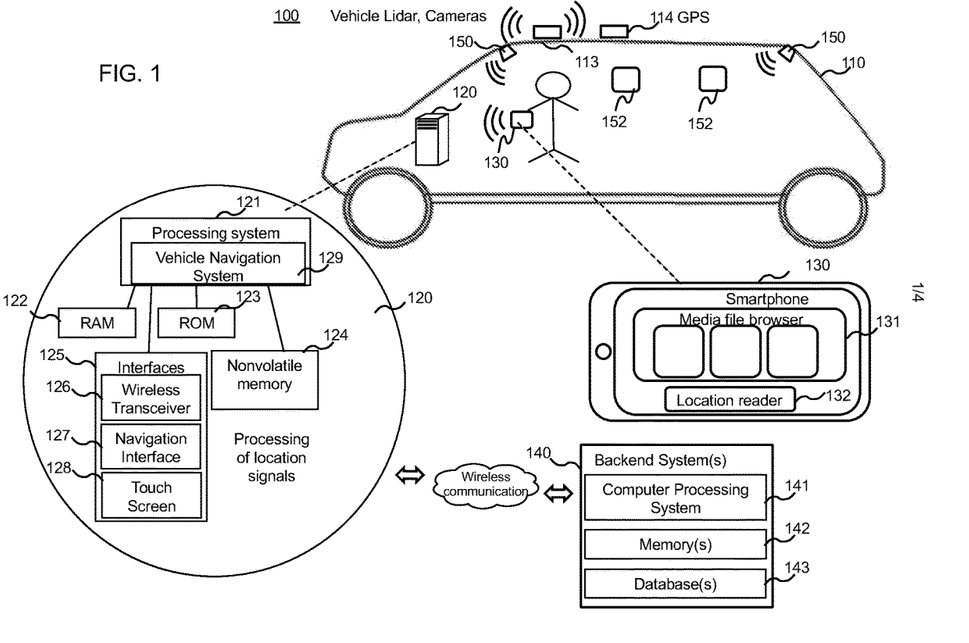
FIG. 1 is a block diagram in partial schematic form of an illustrative framework for an approach of setting a destination in a vehicle navigation system according to examples of the disclosure.

Referring now to FIG. 1, an illustrative framework 100 for an approach of setting a destination in a vehicle navigation system is shown according to examples of the disclosure. The framework 100 includes a vehicle 110 including a location processing and control system 120 and a wireless device 130. A location processing and control system 120 (such as a computer system) can be configured so as to wirelessly communicate with the wireless device 130 and to process location information and optionally control the vehicle 110 based thereon. The wireless device 130 can be, e.g., a smartphone 130 or other suitable device via which a vehicle occupant can browse and select media files, and from which the location processing and control system 120 can receive location signals indicating geographical locations corresponding to selected media files on the wireless device. In some configurations, the vehicle is an autonomous vehicle. However, it should be appreciated that the present systems and methods suitably can be used in any type of vehicle, such as vehicles that use different categories of automation, are fully non-automated, or have any suitable level of automation. In various embodiments the vehicle 110 can be configured with an array of sensors, including any suitable combination of LIDAR (light detection and ranging) and camera systems 113 for acquiring real-time video imagery of obstacles and other vehicles, GPS (global positioning system) 114, wireless communication systems for sending and receiving communications regarding road information and traffic in real-time, as well as a computer for applying driving rules and making driving decisions based on data and information acquired from the foregoing, in a suitable manner such as conventionally known in the art. Moreover, the functionality described herein may be combined with a conventional vehicle navigation system to provide location processing and detection simultaneously.

In the example illustrated in FIG. 1, location processing and control system 120 includes processing system 121, e.g., one or more central processing units (CPUs) and one or memories utilized by processing system 121, such as random access memory (RAM) 122, random online memory (ROM) 123, and/or nonvolatile memory 124, as well as interfaces 125 via which the vehicle can communicate with the occupant and/or wireless device 130. Nonvolatile memory 124 can include program instructions configured to cause processing system 121 to perform one or more operations such as provided herein. For example, nonvolatile memory 124 can include program instructions for location processing configured to cause processing system 121 to receive location signals received from wireless device 130 using one or more of interfaces 125, and program instructions for processing location signals that are configured to take one or more actions, such as generating a navigation system destination responsive to the location signal. Additionally, vehicle 110 can include a conventional vehicle navigation system 129, which optionally can be stored in nonvolatile memory 124 or in ROM 123 and can be implemented by processing system 121 or otherwise suitably implemented by vehicle 110. The destination of the vehicle navigation system 129 can be set based on program instructions in nonvolatile memory 124. The vehicle may also include one or more cameras 150 that may communicate with the location processing and control system 120 by wired and/or wireless communication, e.g., to communicate image data captured by the camera(s) from imagery presented by the passenger (e.g., image of landmark or map intersection whether in paper form or displayed on the screen of the passenger's smartphone or other device 130). Even where the passenger has images stored on her smartphone 130 or other electronic device, capture of such imagery by camera(s) 150 may be desirable where geolocation metadata (geotags) have not been stored with the images, or where the passenger chooses not to share such metadata.

In the illustrative configuration illustrated in FIG. 1, the system 120 may include a wireless transceiver 126, navigation interface 127, and optional touch screen 128. In such embodiments, the wireless transceiver 126 can be configured to connect to the wireless device 130 of the vehicle occupant, e.g., a smartphone held by the occupant, and to receive a signal from the wireless device 130 that indicates a geographical location corresponding to a selected media file on the wireless device. For example, the wireless transceiver 126 can include a cellular transceiver configured to provide communication between the vehicle 110 and the wireless device 130 of the intended passenger via a cellular connection, e.g., so as to receive a location signal from the wireless device. The wireless transceiver 126 may also include a Bluetooth transceiver configured to permit communication with the wireless device 130 via a Bluetooth connection, and/or a Wi-Fi transceiver configured to permit communication with the wireless device 130 via a Wi-Fi connection, e.g., so as to receive a location signal from the wireless device. The navigation interface 127 can be configured to provide a conventional interface between the vehicle occupant and the vehicle navigation system 129, e.g., by receiving user input via the touch screen 128 or other user input device for entering a destination, and by displaying a map showing the destination and/or route to the destination. Additionally, the navigation interface 127 can be configured to set a destination in the vehicle navigation system 129 based on processing of a location signal received from the wireless device 130 in a manner such as provided herein.

The wireless device 130, e.g., a smartphone, can include a media file browser 131 and an optional location reader 132. The media file browser 131 can be configured to allow the vehicle occupant to view and select media files, such as photographs and/or videos, that are stored locally on wireless device 130. For example, the media file browser 131 can include a photo album stored in nonvolatile memory of the wireless device 130. Additionally, the media file browser 131 can be configured to allow the vehicle occupant to view and select media files, such as photographs and/or videos, that are stored remotely, e.g., on a remote server in communication with the wireless device 130 via a cellular, Bluetooth, and/or Wi-Fi connection. For example, the media file browser 131 can include a web browser or an application stored in nonvolatile memory of the wireless device 130. It should be appreciated that the wireless device 130 can include any suitable number and types of media file browsers 131.

At least some of the media files that the vehicle occupant can browse using the media file browser 131 can include information about a geographical location shown in or otherwise associated with that media file. For example, at least some of the media files can include metadata (such as a geotag) identifying a geographical location at which the respective media file was generated, which the respective media file depicts, or which the respective media file otherwise is associated. Metadata identifying a geographical location can include, for example, an address and/or a latitude and longitude of the geographical location. As one nonlimiting example, a photograph of a particular beach can include metadata identifying the geographical location of the beach; such metadata optionally can have been generated (e.g., using geotagging) when the photograph was taken, or optionally can have been added to the photograph at a later time.

In various embodiments, the media file browser 131 can be configured so as to receive a selection of a media file by the vehicle occupant. For example, while browsing the media files, the vehicle occupant can select a media file depicting or otherwise associated with a geographical location to which the vehicle occupant desires to go. Such selection can be implemented in any suitable manner compatible with the media file browser 131 and the particular type of wireless device 130, such as applying pressure to the device's screen in a region corresponding to the selected media file, swiping across the device's screen in a region corresponding to the selected media file, selecting a checkbox or radio button associated with the selected media file, selecting an icon indicating that the media file being viewed should be shared, and the like.

Additionally, the wireless device 130 optionally can include the location reader 132 that is coupled to media file browser 131. The optional location reader 132 can be configured so as to obtain from the selected media file the information about the geographical location associated with that media file. For example, the optional location reader 132 can be configured so as to parse the metadata of that media file and to extract the information about the geographical location therefrom.

In various embodiments the wireless device 130 can be configured so as to transmit to the vehicle 110 a location signal indicating the geographical location corresponding to the selected media file. For example, the wireless device 130 can include programming instructions configured to cause the location signal to be transmitted to the vehicle 110 via a cellular, Bluetooth, or Wi-Fi connection. The location signal can be provided in any suitable form. Illustratively, in some configurations the location signal can include the selected media file, including metadata of the media file. In other illustrative configurations, the location signal can include, or optionally consist only of, metadata of the media file. Alternatively, in some configurations the location signal can consist only of an indication of the geographical location corresponding to the selected media file. For example, in one nonlimiting configuration the optional location reader 132 can extract the information about the geographical location from metadata of the media file, and such extracted information can be transmitted to vehicle the 110. Accordingly, in various configurations provided herein, the location signal can include the latitude and longitude of the geographical location and/or the address of the geographical location, or optionally can consist of the latitude and longitude of the geographical location and/or the address of the geographical location.

Responsive to the location signal, in various embodiments the vehicle 110 is configured so as to use the location signal received from the occupant's wireless device 130 so as to set a destination in the vehicle navigation system 129. Such destination can include the geographical location corresponding to the selected media file, for example, GPS coordinates of latitude and longitude. For example, program instructions for location processing can be stored in the nonvolatile memory 124 and can be configured so as to cause the processing system 121 to obtain from the wireless transceiver 126 the location signal from the wireless device 130 which includes GPS latitude and longitude and to generate a navigation system destination location and route based thereon. For example, the vehicle navigation system can generate a generate a route using such GPS coordinates in any suitable manner such as conventionally known to those of skill in the art. As noted previously, the vehicle navigation system 129 may communicate to the passenger, e.g., verbally via voice rendering or visually via one or more display screens 152 in the passenger compartment, its identification of the destination location, so that the passenger may confirm the accuracy of that destination, and the vehicle may then be driven to that location destination. A visual display of the identified destination location may be, for example, an image picture of the destination itself, an identification of an intersection on a map, etc. The location processing and control system 120 further can be configured to cause the vehicle 110 to travel to the navigation system destination. For example, the vehicle 110 can be an autonomous vehicle configured so as to drive itself to a destination set in the navigation system. Self-driving configurations of autonomous vehicles are known in the art. Alternatively, a human driver may drive to the destination location.

As yet another option, the location processing and control system 120 further can be configured to cause the vehicle navigation system 129 to display the media file at a location on a map corresponding to the geographical location, e.g. via the navigation interface 127 and/or the touch screen 128. For example, as described above, in some configurations the wireless device 130 is configured so as to transmit the selected media file to the vehicle 110. The location processing and control system 120 can be configured to store the media file that it receives from the wireless device 130 in ROM 123 or in nonvolatile memory 124, can be configured to store the indication of the geographical location corresponding to that media file, and can be configured to display the media file at a location of a map of the navigation interface 127 corresponding to that geographical location. The location processing and control system 120 further can be configured to generate an additional navigation system destination responsive to selection of the received media file on the map. For example, the media file displayed on the map can serve as an icon or avatar representing the geographical location associated with that media file. Rather than conventionally entering an address of that geographical location, which can be cumbersome, the vehicle occupant can select the icon or avatar of that media file so as to automatically set the destination of the vehicle navigation system to the associated geographical location on a future trip.

Figure 2:
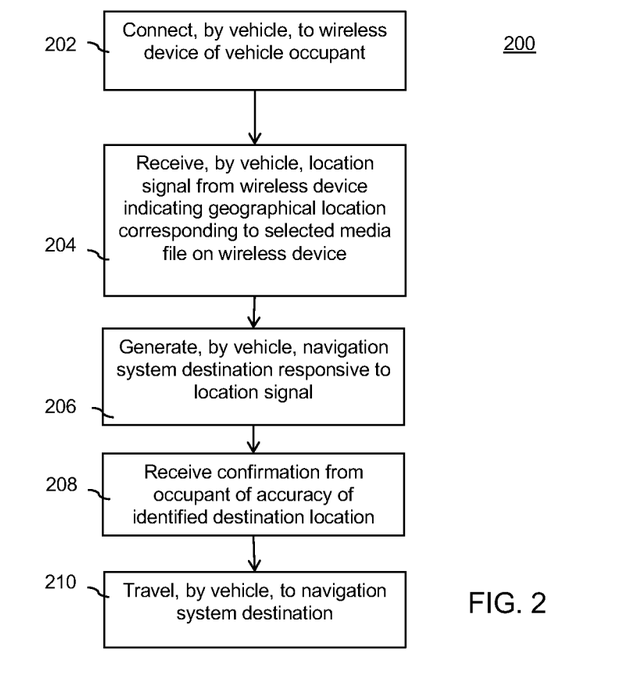
FIG. 2 is a flow chart of an illustrative method of setting a destination at a vehicle navigation system according to examples of the disclosure.

It should be appreciated that the system 100 illustrated in FIG. 1 can be used in any suitable method for setting destinations in a vehicle navigation system. For example, FIG. 2 illustrates a flow chart of an illustrative approach of setting a destination in a vehicle navigation system according to examples of the disclosure. A method 200 illustrated in FIG. 2 can be implemented using components of the system 100 illustrated in FIG. 1 or can be implemented using components of any other suitable system.

The method 200 illustrated in FIG. 2 can include at a step 202 connecting, by a vehicle, to a wireless device of a vehicle occupant. For example, the vehicle 110 illustrated in FIG. 1 can be configured so as to connect to the wireless device 130 via the wireless transceiver 126, e.g., via a Bluetooth, cellular, and/or Wi-Fi connection. Such connection can be periodical, continuous, or in response to push or pull signals from or to the wireless device 130. In one nonlimiting example, the wireless device includes a smartphone.

The method 200 illustrated in FIG. 2 also can include at a step 204 receiving, by the vehicle, a location signal from the wireless device indicating a geographical location corresponding to a selected media file on the wireless device. For example, in a manner such as described with reference to FIG. 1, the vehicle 110 can receive a location signal from the wireless device 130 responsive to user selection of a media file on that device, such as a photograph or video that can be stored on the wireless device and viewed with the media file browser 131 or can be stored remotely for viewing on the wireless device and viewed with the media file browser 131. As described with reference to FIG. 1, the location signal optionally can include a latitude and longitude of the geographical location and/or an address of the geographical location. Also as described with reference to FIG. 1, the location signal optionally can include the selected media file and/or metadata of the selected media file.

The method 200 illustrated in FIG. 2 also can include at a step 206 generating, by the vehicle, a navigation system destination responsive to the location signal. For example, in a manner such as described with reference to FIG. 1, the vehicle 110 can set a destination in the navigation system 129 responsive to the location signal. Optionally, as described with reference to FIG. 1, the vehicle 110 can display the media file at a location on a map corresponding to the geographical location. The vehicle 110 optionally can generate an additional navigation system destination responsive to selection of the received media file on the map. As yet another option, the vehicle 110 can travel to the navigation system destination, e.g., autonomously. As shown at a step 208, the vehicle 110 may receive confirmation by the passenger/occupant of the vehicle 110 of the accuracy of the identified location destination as determined by the navigation system 129. As shown at a step 210, the vehicle 110 may travel to the destination location identified by the navigation system 129.

Figure 3:
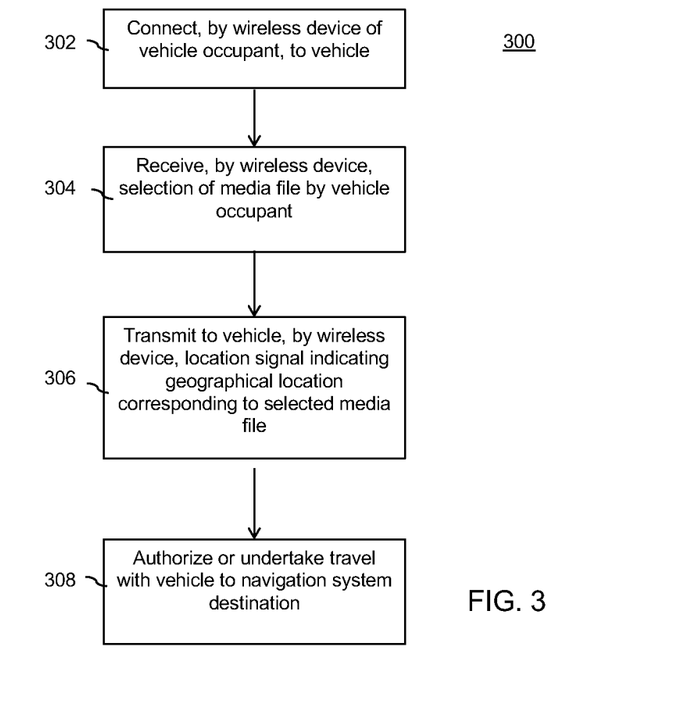
FIG. 3 is a flow chart of another illustrative method of setting a destination at a vehicle navigation system according to examples of the disclosure.

FIG. 3 illustrates a flow chart of another illustrative approach of setting a destination in a vehicle navigation system according to examples of the disclosure wherein communications may be initiated by a user at the passenger's wireless device 130. A passenger may still respond to prompts communicated by the vehicle navigation system 129, but the passenger is not limited to simply responding to prompts and may initiate actions and communication himself A method 300 illustrated in FIG. 3 can be implemented using components of the system 100 illustrated in FIG. 1 or can be implemented using components of any other suitable system. The method 300 illustrated in FIG. 3 can include at a step 302 connecting, by a wireless device of a vehicle occupant, to a vehicle. For example, the wireless device 130 illustrated in FIG. 1 can connect to the vehicle 110 via Bluetooth, cellular, and/or Wi-Fi connection. The method 300 can include at a step 304 receiving, by the wireless device, selection of a media file by the vehicle occupant. The method 300 can include at a step 306 transmitting to the vehicle, by the wireless device, a location signal indicating a geographical location corresponding to the selected media file. Various configurations and options for the wireless device, vehicle, signals, and operations are described elsewhere herein. At a step 308, the passenger may authorize or undertake travel with the vehicle to a navigation system destination. For example, the passenger may authorize an autonomous vehicle to drive to the destination location, authorize another human driver to drive to the destination location, or drive the vehicle herself to the destination location.

According to another example, a passenger may undertake vehicle navigation and travel with the use of imagery that the passenger presents for image capture via a camera 150 at the vehicle 110 shown in FIG. 1, wherein one or more images captured by the camera 150 are then analyzed by the location processing and control system 120 by image analysis to determine the destination location from the image. In this approach, the passenger may present a picture to the camera and say, e.g., "Take me here," or "Take me to this location," or some other like phrase. This approach may be considered "zero click" navigation in the sense that it does not require the user to actively undertake tedious finger-swipe or touchscreen inputs. This approach may be carried out by the system illustrated in FIG. 1 or with other suitable system. In some examples, a picture of a desired location (e.g., landmark, monument, streetscape, statue, map intersection, written address, etc., in paper form or in electronic form displayed on the screen of a smartphone or other mobile device) may be presented by the passenger to the camera 150 of the vehicle, and an image of the picture may be captured by the camera 150 and processed by the vehicle by the location processing and control system 120 by image analysis to determine the desired location. In either case, the navigation system 129 may visually or verbally (through voice rendering) communicate the identified location destination to the passenger so that the passenger may confirm the intended designation location before navigation begins. Illustrative details of this approach were described with reference to FIG. 1 and additional disclosure is presented below with reference to FIG. 4 and FIG. 1.

Figure 4:
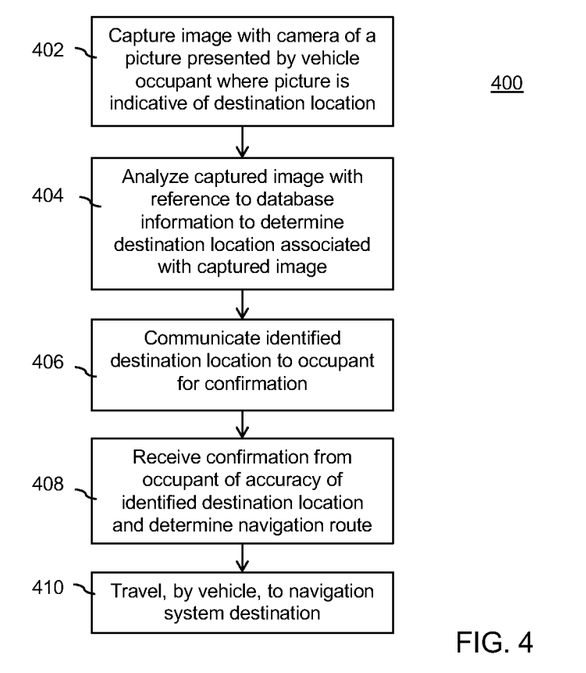
FIG. 4 is a flow chart of an illustrative method of setting a destination in a vehicle navigation system according to examples of the disclosure.

As shown in FIG. 4, a method 400 may include a step 402 of capturing an image by a camera 150 of a picture presented by the passenger/occupant wherein the picture is indicative of the passenger's desired destination location. For example, the passenger may present a picture to the camera 150 and say, e.g., "Take me here," or "Take me to this location," or some other like phrase, and the camera 150 may capture an image of the picture. As noted above, in some examples, an image of a desired location (e.g., landmark, monument, streetscape, statue, map intersection, written address, etc.) in paper form or in electronic form such a displayed on the screen of a smartphone or other mobile device 130.

At a step 404, the captured image of the passenger's picture may be analyzed with image analysis with reference to information regarding location imagery stored in suitable database(s) to determine the particular destination location associated with the captured image of the passenger's picture. In this regard, the location processing and control system 120 carry out image analysis on the captured image and/or the location processing and control system 120 may transmit the capture image wireless to a backend processing system 140 for image analysis, or some combination of both. Where the passenger presents a picture that provides a textual street address, the location processing and control system 120 may carry out text recognition of the captured image of the passenger's picture and compare the recognized address against proper address information in a suitable database, e.g., in the ROM 123 or in the database 143, to verify that the address is a proper address and to determine the destination location associated with capture image.

Where the passenger presents a picture that provides a portion of a map, e.g., for which the passenger's finger or other pointer identifies a particular location on the map, such as an intersection or a street location between two intersections, the location processing and control system 120 may readily recognize that the captured image is that of a map and may carry out comparison matching of map data for the local region in order to determine the particular destination location associated with the captured image.

The captured image of the passenger's picture may be processed by image analysis at the processing system 121 and/or or at the computer processing system 141 associated with the member 142 of the backend system 140 to match the image with an image associated with specific location metadata. Suitable image processing known in the art for this purpose will be described further herein. Image analysis carried out by the computer processing system 121 and/or 141 can correlate the captured image to a reference image stored in an image database, e.g., a remote database 143 at the backend system, for which location metadata (e.g., GPS coordinates, street address, etc.) are known to provide a precise determination for the destination location associated with the captured image of the passenger's picture.

For example, databases 143 can include a database storing a repository of reference images with associated location metadata (such as GPS coordinates and/or street addresses) corresponding to such images. The vehicle can use correlations between the reference images and images obtained from the intended passenger's smartphone to identify the passenger's actual location and accept him or her. For example, the computer processing system 121 and/or 141, programmed with program instructions, may be configured to submit a query, via the wireless network, to the image database 143 of the backend system(s) 140 to identify a reference image corresponding to the view within the received image. In other embodiments, the location processing and control system 120 can store such repository locally, e.g., within ROM 123 or nonvolatile memory 124, and suitably query the repository without the need to access backend system(s) 140. Since many excursions by vehicle are local in nature, the fact that the passenger's and vehicle's present location is already known (the vehicle knows its present GPS coordinates) makes the identification of the destination location easier. The present location GPS coordinates may be utilized by the processing system 121 and/or 141 as a basis for searching a local region such that only a relatively small collection of database images, which are tagged with geolocation metadata, need to undergo image processing to determine the destination location. For example, landmark images for an entire country or state or county need not be analyzed; rather only landmark imagery whose known metadata location information within a suitable predetermined distance, such as a radius of, e.g., 20 miles, 30 miles, 40 miles, 50 miles, etc., need undergo image analysis to for matching the captured image of the passenger's picture. In this regard, image data of outdoor scenery whose geolocation metadata correspond to locations with a predetermined variance (radius) of the approximate location of the passenger (e.g., from GPS coordinates of the vehicle's present location) may be identified from a database(s) of image data of outdoor scenery for image processing analysis to search for a match between the image the passenger took and image data of the selected scenery images whose geolocation metadata falls within the predetermined distance. To further narrow the search, the passenger/occupant may be queried to provide an estimated distance from the destination location. For instance, the vehicle through voice rendering or display mask ask the occupant/passenger approximately how far away the destination location is or whether it is within 10 miles, 20 mile, 30 miles, etc. While in many instances, the picture presented by the vehicle occupant/passenger may be of outdoor scenery, the disclosure is not limited to such, and the picture presented may comprise notable and recognizable indoor scenery, e.g., of an architectural landmark, associated with known geolocation coordinates or address.

Image processing techniques are known in the art for matching one image to another image from a database of images, and any suitable technique(s) for such matching may be used to carry out this aspect of the disclosure. For example, image processing using Scale Invariant Feature Transform (SIFT), Speeded-Up Robust Features (SURF), and Features from Accelerated Segment Test (FAST), which are known in the art, may be used in this regard, such as discussed in the following articles, the entire contents of which are incorporated herein by reference: Lowe, "Object recognition from local scale-invariant features," Proceedings of the International Conference on Computer Vision, 1999, pp. 1150-1157; Bay et al., "Speeded-Up Robust Features (SURF)," Comput. Vis. Image Understand, vol. 110, no. 3, pp. 346-359, June 2008; Rosten et al., "Machine Learning for High-Speed Corner Detection, European Conference on Computer Vision, ECCV 2006: Computer Vision, pp. 430-443. Additional image processing methods that may be applicable are noted in "A Survey On Image Matching Methods," Krishnan et al., International Journal of Latest Research in Engineering and Technology (IJLRET), January 2016, pp. 58-61, the entire contents of which are incorporated herein by reference. It should be understood that the image data in the database(s) of image data of outdoor scenery need not necessarily be stored as pixelated images, and such image data may be already be vectorized or otherwise preprocessed in any suitable way to as to facilitate efficient and speedy image processing of matching the image taken by the passenger to image data identified as being within the location variance (radius) of the passenger's location, depending upon the image processing approach utilized.

As another example, transforming the image using a suitable transformation, such as zero-centering the pixel data or image normalization so the image obtained by the passenger's smartphone is substantially unaffected by temporal lighting conditions that differ from the reference images in the backend system(s), and performing a query against the database of images based on the transformed image using deep learning and neural networks may be used. For example, the captured image of the passenger's picture can be processed by a deep neural network that is part of the backend system(s) which has been trained to detect landmarks found in the database(s) of reference image data whose geolocation metadata corresponds to locations within the predetermined variance of the passenger's smartphone location. Examples of such landmarks can be building facades, vegetation, street signs, traffic signals, statues, monuments, etc., and combinations thereof. One or more landmarks may be detected in the captured image of the passenger's picture using the deep neural network and matched to image data of known geolocation to identify a more accurate position for the passenger. Detailed implementations of examples of convolutional neural network systems for identifying matching image data, and which may be utilized for such purpose in the methods disclosed herein, are described in the following references, the entire contents of each of which are incorporated by reference herein: Weyand et al., "PlaNeT: Photo Geolocation with Convolutional Neural Networks, in Leibe et al. (Eds.), Computer Vision—EECV 2016, Part VIII, Lecture Notes in Computer Science 9912, pp. 37-55 (Springer, 2016); Arandjelović et al., "NetVLAD: CNN architecture for weakly supervised place recognition," 2016 IEEE Conference on Computer Vision and Pattern Recognition (CVPR), Las Vegas, Nev., pp. 5297-5307 (2016); and Arandjelović et al., "NetVLAD: CNN architecture for weakly supervised place recognition," arXiv:1511.07247v3 [cs.CV] 2 May 2016, 17 pages (obtained from https://arxiv.org/abs/1511.07247). It will be appreciated that such approaches may involve training a convolutional neural network (CNN) architecture using a large reference database of outdoor scene images (place images) such as obtained with Google Street View Time Machine and/or other sources. Such reference image data may associate multiple place images for the same location wherein the multiple images of the same place are taken, e.g., at different times of day, from different perspectives and distances, and with different amounts of collateral clutter (automobiles, pedestrians, etc.). Such images may be vectorized, such as known in the art and as described in the referenced articles above, and the CNN may be trained against known training query images, such as described in the articles referenced above, to enable the CNN to match actual query images to image data of the reference database(s).

At a step 406 of the method 400, the vehicle may communicate the identified destination location to the passenger/occupant for confirmation that the identified destination location is accurate. At a step 408, the vehicle may receive confirmation from the passenger/occupant of the accuracy of the identified destination location, and the vehicle's navigation system 129 may then determine (plot) the navigation route. As shown at a step 410, the vehicle may then travel to the destination location e.g., autonomously or under the control of the driver as suitable. Other features as described previously in connection with FIGS. 1-3 are applicable and may be combined with features as disclosed above in connection with FIG. 4.

This written description describes illustrative embodiments, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code including program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated.

While the present disclosure has been described in terms of illustrative embodiments, it will be understood by those skilled in the art that various modifications can be made thereto without departing from the scope of the claimed subject matter as set forth in the claims.

What is claimed is:

1. A method of setting a destination at a vehicle navigation system, the method comprising:
   connecting, by the vehicle, to a wireless device of a vehicle occupant;
   receiving, by the vehicle and from the wireless device, a selected media file having associated metadata, wherein the media file includes a photograph or video;
   determining location information associated with the selected media file based on the associated metadata, wherein the associated metadata includes a location depicted in the photograph or video, a geotag at which the media file was generated, or a written latitude and longitude, address, or place depicted in the photograph or video;
   determining, by the vehicle, a destination location based on the determined location information; and
   plotting a navigation course to the determined destination location.

2. The method of claim 1, wherein the location information includes the latitude and longitude of the destination location.

3. The method of claim 1, wherein the location information includes the address of the destination location.

4. The method of claim 1, further comprising displaying, by the vehicle, the media file at a location on a map corresponding to the destination location.

5. The method of claim 4, further comprising generating, by the vehicle, an additional navigation system destination responsive to selection of the displayed media file on the map.

6. The method of claim 1, further comprising the vehicle traveling to the destination location.

7. The method of claim 1, wherein the wireless device includes a smartphone.

8. A system for setting a destination at a vehicle navigation system, the system comprising:
   a processing system; and
   a memory,
   wherein the processing system is configured to:
      connect a wireless transceiver at an automotive vehicle a to a wireless device of a vehicle occupant;
      receive, by the vehicle and from the wireless device, a selected media file having associated metadata, wherein the media file includes a photograph or video;
      determine location information associated with the selected media file based on the associated metadata, wherein the associated metadata includes a location depicted in the photograph or video, a geotag at which the media file was generated, or a written latitude and longitude, address, or place depicted in the photograph or video;
      determine, by the vehicle, a destination location based on the determined location information; and
      plot a navigation course to the determined destination location.

9. The system of claim 8, wherein the location information includes the latitude and longitude of the destination location.

10. The system of claim 8, wherein the location information includes the address of the destination location.

11. The system of claim 8, wherein the computer processing system is further configured to cause the vehicle navigation system to display, by the vehicle, the media file at a location on a map corresponding to the destination location.

12. The system of claim 11, wherein the computer processing system is further configured to generate, by the vehicle, an additional navigation system destination responsive to selection of the displayed media file on the map.

13. The system of claim 8, wherein the computer processing system is further configured to cause the vehicle to travel to the destination location.

14. The system of claim 8, wherein the wireless device includes a smartphone.

\* \* \* \* \*